United States Patent
Coghill (10) Patent No.: US 11,293,581 B2
(45) Date of Patent: Apr. 5, 2022

(54) PIPELINE INSPECTION SYSTEM

(71) Applicant: SAN DIEGO COUNTY WATER AUTHORITY, San Diego, CA (US)

(72) Inventor: Martin Robert Coghill, San Diego, CA (US)

(73) Assignee: SAN DIEGO COUNTY WATER AUTHORITY, San Diego, CA (US)

( * ) Notice: Subject to any disclaimer, the term of this patent is extended or adjusted under 35 U.S.C. 154(b) by 483 days.

(21) Appl. No.: 16/440,867

(22) Filed: Jun. 13, 2019

(65) Prior Publication Data
US 2020/0393075 A1  Dec. 17, 2020

(51) Int. Cl.
F16L 55/44 (2006.01)
G01M 3/00 (2006.01)
F16L 101/30 (2006.01)

(52) U.S. Cl.
CPC ............ F16L 55/44 (2013.01); G01M 3/005 (2013.01); *F16L 2101/30* (2013.01); *G01N 2291/2636* (2013.01)

(58) Field of Classification Search
CPC ............ G01M 3/005; G01N 2291/2636; F16L 55/44; F16L 2101/30
See application file for complete search history.

(56) References Cited

U.S. PATENT DOCUMENTS

| | | | | |
|---|---|---|---|---|
| 3,761,623 A | * | 9/1973 | Hara | F16L 55/32 348/84 |
| 3,958,080 A | * | 5/1976 | Schadler | G01M 3/005 348/84 |
| 4,244,296 A | * | 1/1981 | Vertut | G02B 6/08 104/138.2 |
| 4,537,136 A | * | 8/1985 | Douglas | F16L 55/34 104/138.2 |
| 4,722,001 A | * | 1/1988 | Rohrich | G01M 3/005 348/84 |
| 7,505,063 B1 | * | 3/2009 | Bastedo | B08B 9/043 15/104.05 |

FOREIGN PATENT DOCUMENTS

| | | | |
|---|---|---|---|
| GB | 2097326 | * | 11/1982 |
| GB | 2129653 | * | 5/1984 |
| WO | WO 00/003863 | * | 1/2000 |
| WO | WO 2014/062077 | * | 4/2014 |

* cited by examiner

*Primary Examiner* — Daniel S Larkin
(74) *Attorney, Agent, or Firm* — Pillsbury Winthrop Shaw Pittman LLP (57) ABSTRACT

A pipeline inspection system is described. The system comprises a body, cameras, support members, and light sources. The cameras are coupled to the body and configured to obtain image information related to an interior surface of the pipe. The support members extend away from the body in a radial direction to contact the interior surface of the pipe and support the body. An individual support member has a first end coupled to the body, and a second end configured to contact the interior surface of the pipe. The light sources are configured to light the interior surface of the pipe. They are coupled to the support members at or near the second end such that the light sources are located in one or more radial positions near the interior surface of the pipe, separated from the one or more cameras and the body by the one or more support members.

14 Claims, 11 Drawing Sheets

PIPELINE INSPECTION SYSTEM

BACKGROUND OF THE INVENTION

Field of the Invention

The present disclosure relates to a system configured to facilitate inspection of utility pipes.

Description of Related Art

Utility pipes are known. Extensive networks of utility pipes exist throughout and between most cities. These pipes typically transport fluid including liquid, gas, and other fluids. Utility pipes are often inspected by humans physically present inside a pipe. Human inspection may be costly, time consuming, and/or have other disadvantages.

SUMMARY OF EMBODIMENTS OF THE INVENTION

One aspect of the present disclosure relates to a pipeline inspection system. The pipeline inspection system may comprise a body, one or more cameras, one or more support members, one or more light sources, and/or other components. The body may extend along a longitudinal axis of the system. The longitudinal axis of the system may correspond to a longitudinal axis of a pipe when the system is inserted in the pipe. The one or more cameras may be coupled to the body. The one or more cameras may be configured to obtain image information related to an interior surface of the pipe and/or other objects. The one or more support members may be coupled to the body. The one or more support members may extend away from the body in a radial direction and/or other directions. The one or more support members may be configured to contact the interior surface of the pipe and support the body in the pipe when the system is inserted in the pipe. An individual support member may have a first end coupled to the body, and a second end configured to contact the interior surface of the pipe. The one or more light sources may be configured to light the interior surface of the pipe and/or other areas. The one or more light sources may be coupled to the one or more support members at or near the second end such that the one or more light sources are located in one or more radial positions near the interior surface of the pipe, separated from the one or more cameras and the body by the one or more support members.

In some embodiments, the body may comprise a leading end and a trailing end and/or other components. The one or more cameras may be coupled to the body at or near the leading end. In some embodiments, the system may comprise a camera plate coupled to the body (e.g., at or near the leading end) and configured to support the one or more cameras. In some embodiments, the camera plate may have a circular cross section and/or other cross sections. In some embodiments, the one or more cameras may comprise at least two cameras. The at least two cameras may be coupled to the camera plate at radial positions equidistant from each other at or near a circumference of the camera plate, and/or in other locations. In some embodiments, the camera plate may be configured to rotate relative to the body. In some embodiments, the camera plate may be configured to rotate around the longitudinal axis of the system. In some embodiments, the camera plate may comprise a weight and/or other components. The weight may be configured to cause the camera plate to rotate relative to the body and around the longitudinal axis of the system to maintain an orientation of the one or more cameras relative to the pipe when the system travels through the pipe. In some embodiments, the at least two cameras may be coupled to the body (e.g., via the camera plate) in different orientations such that the at least two cameras are configured to obtain different but overlapping image information for different portions of the interior surface of the pipe.

In some embodiments, the system may comprise one or more wheels coupled to the second end of the one or more support members. The one or more wheels may be configured to contact the interior surface of the pipe and facilitate movement of the system through the pipe.

In some embodiments, the one or more support members may comprise at least three support members. In some embodiments, the at least three support members may be configured such that not all of the at least three support members need contact the interior surface of the pipe when the system is in the pipe. In some embodiments, the one or more support members may be coupled to the body by one or more joints configured to facilitate movement of the one or more support members from a radially extended position to a collapsed position proximate to the body and vice versa. In some embodiments, the system may comprise a first set of the one or more support members and a second set of the one or more support members. The first set of the one or more support members may be coupled to a first (e.g., leading) end of the body and the second set of the one or more support members may be coupled to a second, opposite (e.g., trailing) end of the body such that the body extends between the first set and the second set along the longitudinal axis of the system.

In some embodiments, the system comprises a transmitter and/or other components operatively coupled to the one or more cameras and configured to transmit the image information to an external computing system.

Another aspect of the present disclosure relates to a method of assembling a pipeline inspection system. The method may comprise providing a body of the system. The body may extend along a longitudinal axis of the system. The longitudinal axis of the system may correspond to a longitudinal axis of a pipe when the system is inserted in the pipe. The method may comprise coupling one or more cameras to the body. The one or more cameras may be configured to obtain image information related to an interior surface of the pipe. The method may comprise coupling one or more support members to the body. The one or more support members may extend away from the body in a radial direction. The one or more support members may be configured to contact the interior surface of the pipe and support the body in the pipe when the system is inserted in the pipe. An individual support member may have a first end coupled to the body, and a second end configured to contact the interior surface of the pipe. The method may comprise coupling one or more light sources to the one or more support members at or near the second end such that the one or more light sources are located in one or more radial positions near the interior surface of the pipe, separated from the one or more cameras and the body by the one or more support members. The one or more light sources may be configured to light the interior surface of the pipe.

In some embodiments, the one or more cameras may comprise at least two cameras. The method may comprise coupling the at least two cameras to a camera plate at radial positions equidistant from each other at or near a circumference of the camera plate. In some embodiments, the camera plate may comprise a weight. The method may comprise causing, with the weight, the camera plate to rotate relative to the body and around the longitudinal axis of the system to maintain an orientation of the at least two cameras relative to the pipe when the system travels through the pipe.

In some embodiments, the method may comprise coupling one or more wheels to the second end of the one or more support members. The one or more wheels may be configured to contact the interior surface of the pipe and facilitate movement of the system through the pipe. In some embodiments, the method may comprise coupling the one or more support members to the body by one or more joints configured to facilitate movement of the one or more support members from a radially extended position to a collapsed position proximate to the body and vice versa.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 1:
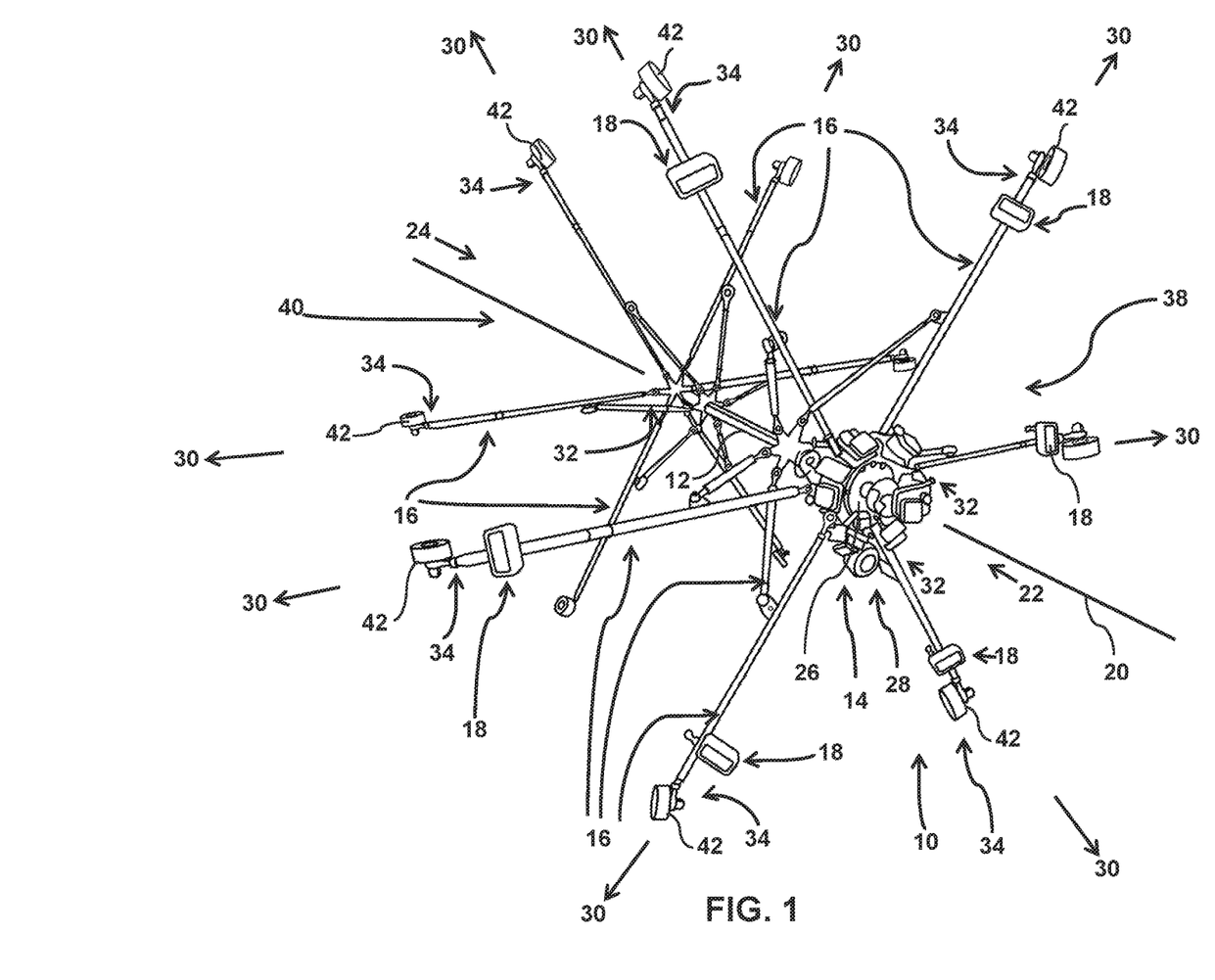
FIG. 1 illustrates a system configured to facilitate inspection of utility pipes, in accordance with one or more embodiments.

FIG. 1 illustrates a system 10 configured to facilitate inspection of utility pipes. Extensive networks of utility pipes conduct liquid and gas under and between most cities. These pipes typically transport fluid including liquid, gas, and other fluids. For example, these pipes may conduct, water, natural gas, oil, etc. In some embodiments, a pipe may be a new pipe, an aging pipe, a pipe in need of repair, a pipe undergoing a retrofit, and/or other pipes. A pipe may be, or configured to be, buried underground. In some embodiments, a pipe may be formed from steel, concrete, iron, plastic, and/or other materials. A pipe may be a cylindrical tube or have other shapes. A pipe may have a specific inside diameter, outside diameter, length and/or other dimensions. In some embodiments, a pipe configured to receive system 10 may have an inside diameter between about 18 inches and about 144 inches. In some embodiments, the length of a pipe (or several pipes coupled to each other) may range between about 10 feet and about 100 miles. It should be noted that these ranges are not intended to be limiting. For example, the dimensions of a pipe, and corresponding dimensions of system 10 may be scaled up or down, or the dimensions of a pipe and/or system 10 may be changed in other ways.

These pipes require inspection at regular intervals to facilitate leak prevention and/or reduction, and/or require inspection for other reasons. Utility pipes are often inspected by humans physically present inside a pipe. Human inspection may be costly, time consuming, and/or have other disadvantages. The expense and/or time may be the result of limited pipeline access points, a need to drain fluid from a pipe for inspection, pipes that have a steep inclination or a steep declination (e.g., making ropes, harnesses, and other safety equipment necessary), and/or other factors. As one example, pipes that conduct water from one area to another may be several feet in diameter. In some locations, a pipe may be oriented at a steep angle of inclination or declination. Inspecting these areas of the pipe from the inside requires draining the water from the pipe, and requires inspectors to use ropes and harnesses for safety to move through the pipe.

Advantageously, system 10 provides an alternative to such an inspection. System 10 can be collapsed and inserted into a pipe (with or without liquid in the pipe) and moved through the pipe for an inspection. In some embodiments, system 10 may be moved through a pipe by dragging or pulling system 10 via a rope, by coupling a motor to system 10 and driving wheels of system 10 with the motor, and/or by other methods. In some embodiments, system 10 may facilitate generating a permanent record of the condition of the inner surface of a pipe by storing imagery electronically. In some embodiments, system 10 may facilitate electronically stitching multiple still images and/or video images together such that the image information comprises a view of the entirety (or near entirety) of the interior surface of a pipe for later viewing and inspection remotely, providing the viewer with a virtual in-pipe experience.

It should be noted that system 10 is described with respect to utility pipes, and specifically water pipes. This is not intended to be limiting. System 10 may be applied to any pipe, below ground or above ground. In addition, the term pipe is not intended to be limiting. System 10 may be applied in other structures where space is created to form a hollow conduit.

As shown in FIG. 1, system 10 may include a body 12, one or more cameras 14, one or more support members 16, one or more light sources 18, and/or other components.

Body 12 may extend along a longitudinal axis 20 of system 10. The longitudinal axis of system 10 may correspond to a longitudinal axis of a pipe when system 10 is inserted in the pipe, for example. In some embodiments, body 12 may have a cylindrical, tubular, square, and/or rectangular cross-sectional shape, and/or have other cross-sectional shapes. In some embodiments, body 12 may be formed from metal, polymers, and/or other materials. For example, in some embodiments, body 12 may be formed from stainless steel. In some embodiments, body 12 may comprise a first end 22 and a second end 24, and/or other components. In some embodiments, first end 22 may be a leading end and second end 24 may be a trailing end. Leading end 22 and/or trailing end 24 may be associated with an orientation of system 10 moving through a pipe, for example. Leading end 22 may be associated with a first portion of system 10 to travel through a section of pipe. Trailing end 24 may be associated with a last portion of system 10 to travel through the pipe. However, this is not intended to be limiting. System 10 may be pushed, pulled, and/or otherwise moved through a pipe in any direction that allows system 10 to function as described herein.

One or more cameras 14 may be coupled to body 12. Cameras 14 may be configured to obtain image information related to an interior surface of the pipe and/or other objects. In some embodiments, cameras 14 may be coupled to body 12 at or near first (e.g., leading) end 22 of body 12, though this is not intended to be limiting. Cameras 14 may be coupled to body 12 in any location that allows system 10 to function as described herein. Cameras 14 may be and/or include video cameras, still image cameras, ultrasound imaging devices, multispectral and/or hyperspectral sensors, thermal imaging cameras, infrared cameras, radar devices, location sensors (e.g., GPS), chemical sensors, temperature sensors, and/or other devices. The image information related to an interior surface of the pipe may include video, pictures, ultrasound images, multispectral and/or hyperspectral images, thermal images, infrared images, radar images, location information (e.g., GPS), chemical information, temperature information, and/or other information.

In some embodiments, system 10 may comprise a camera plate 26 coupled to body 12 (e.g., at or near leading end 22) and configured to support cameras 14. In some embodiments, camera plate 26 may have a circular cross section and/or other cross sections. In some embodiments, cameras 14 may comprise at least two cameras. In some embodiments, cameras 14 comprise six, seven, or more cameras. In some embodiments, cameras 14 may be coupled to camera plate 26 at radial positions equidistant from each other at or near a circumference of the camera plate and/or in other locations. In some embodiments, one or more cameras 14 may be coupled to camera plate 26 such that the camera occupies a position at or near a center of camera plate 26. In some embodiments, the cameras 14 coupled to camera plate 26 may be oriented to face the interior wall and/or other areas of a pipe holding system 10. In some embodiments, the cameras 14 at or near the center of camera plate 26 may be oriented to point down the pipe along the axis of the pipe (e.g., forward or rearward facing cameras 14).

In some embodiments, camera plate 26 may be configured to rotate relative to body 12. In some embodiments, camera plate 26 may be configured to rotate around longitudinal axis 20 of system 10. In some embodiments, camera plate 26 may comprise a weight 28 and/or other components. Weight 28 may be configured to cause camera plate 26 to rotate relative to body 12 and around longitudinal axis 20 of system 10 to maintain an orientation of cameras 14 relative to a pipe when system 10 is in and/or travels through the pipe.

In some embodiments, cameras 14 may be coupled to body 12 (e.g., via camera plate 26) in different orientations such that cameras 14 are configured to obtain different but overlapping image information for different portions of the interior surface of the pipe. For example, individual cameras 14 may be oriented at different angles relative to each other, camera plate 26, body 12, the interior surface of the pipe, and/or other components. The different angles of orientation may cause individual cameras 14 to obtain image information for different portions of the interior surface of the pipe. The image information from individual cameras 14 may be electronically stitched (e.g., by an external computing system and/or one or more processors included in system 10, by an external computing system not associated with system 10, and/or other computing systems) such that the image information comprises a view of the entirety (or near entirety) of the interior surface of the pipe over the distance that system 10 travels through the pipe. In some embodiments, the information from individual cameras 14 may be electronically stitched such that the image information comprises a view of one or more target portions of the interior surface of the pipe.

In some embodiments, cameras 14 may be configured to transmit the image information electronically to an external computing device to facilitate the electronic stitching. In some embodiments, the transmission may be in real time or in near real time. In some embodiments, cameras 14 may be configured to store the image information in electronic storage that is part of cameras 14 and/or a separate component of system 10 for later transfer to the external computing device and stitching.

Figure 2:
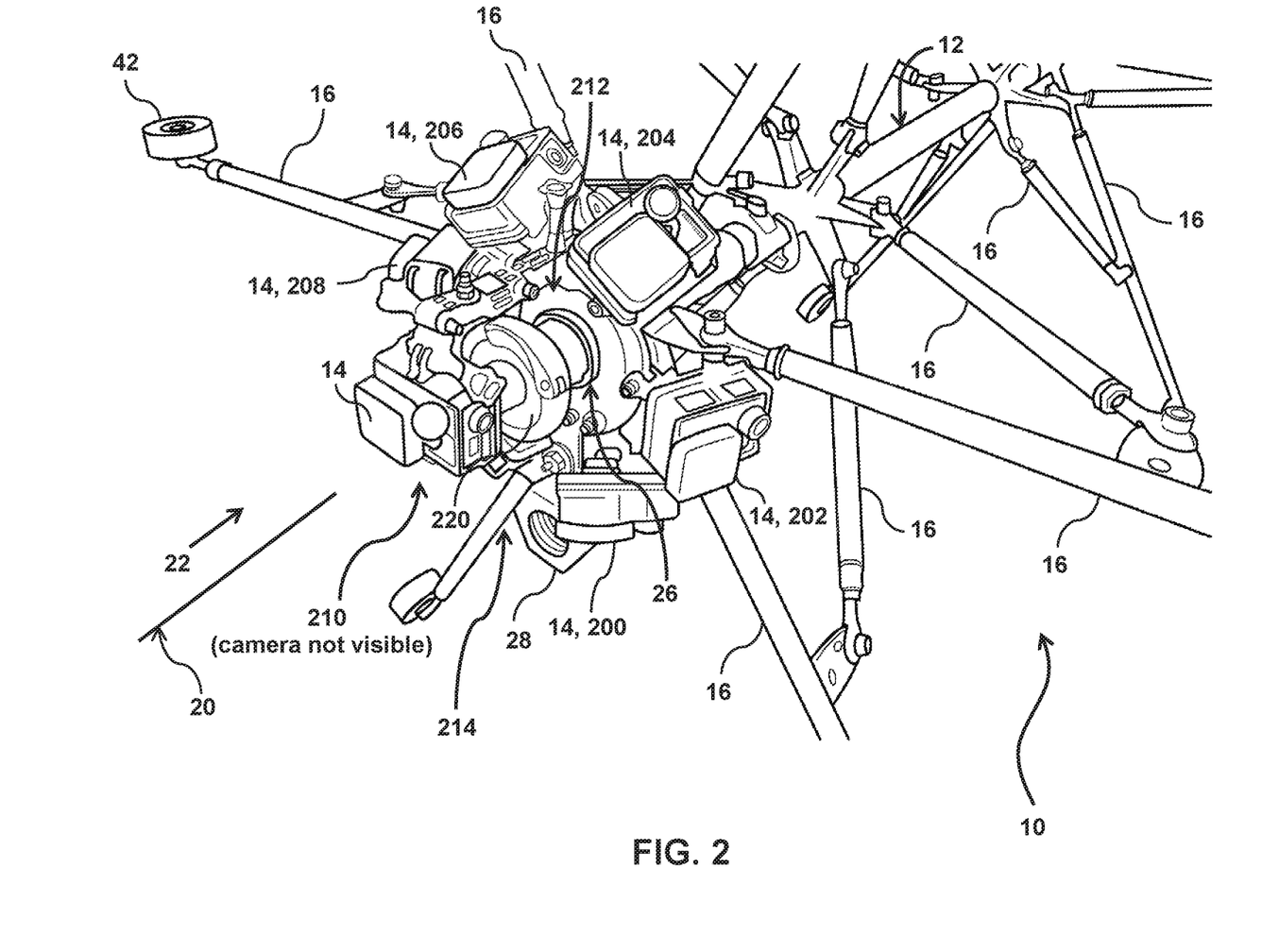
FIG. 2 illustrates a view of a camera plate with seven individual cameras coupled to the camera plate, in accordance with one or more embodiments.
Figure 3:
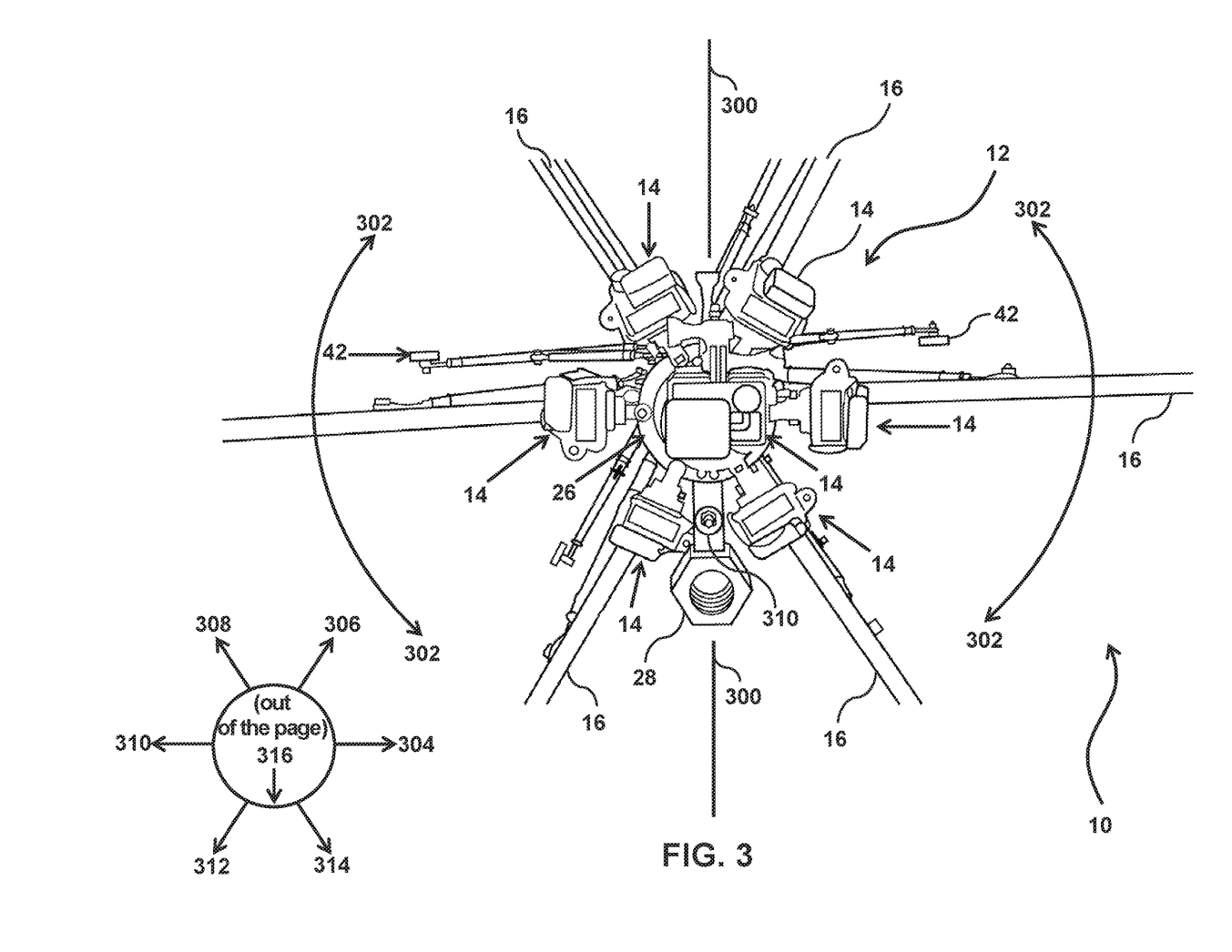
FIG. 3 illustrates a view of cameras from a first (e.g., leading) end of the system, in accordance with one or more embodiments.
Figure 4A:
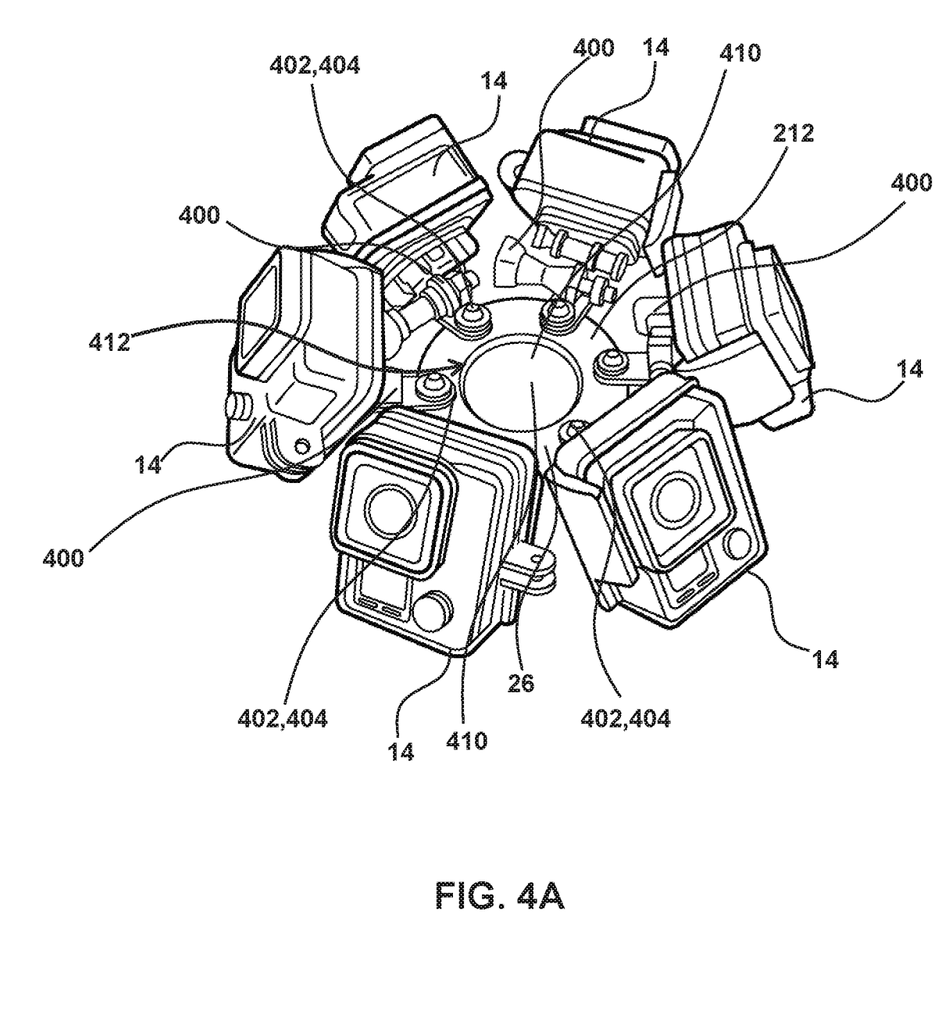
FIG. 4A illustrates six cameras coupled to the camera plate in different orientations, in accordance with one or more embodiments.
Figure 4B:
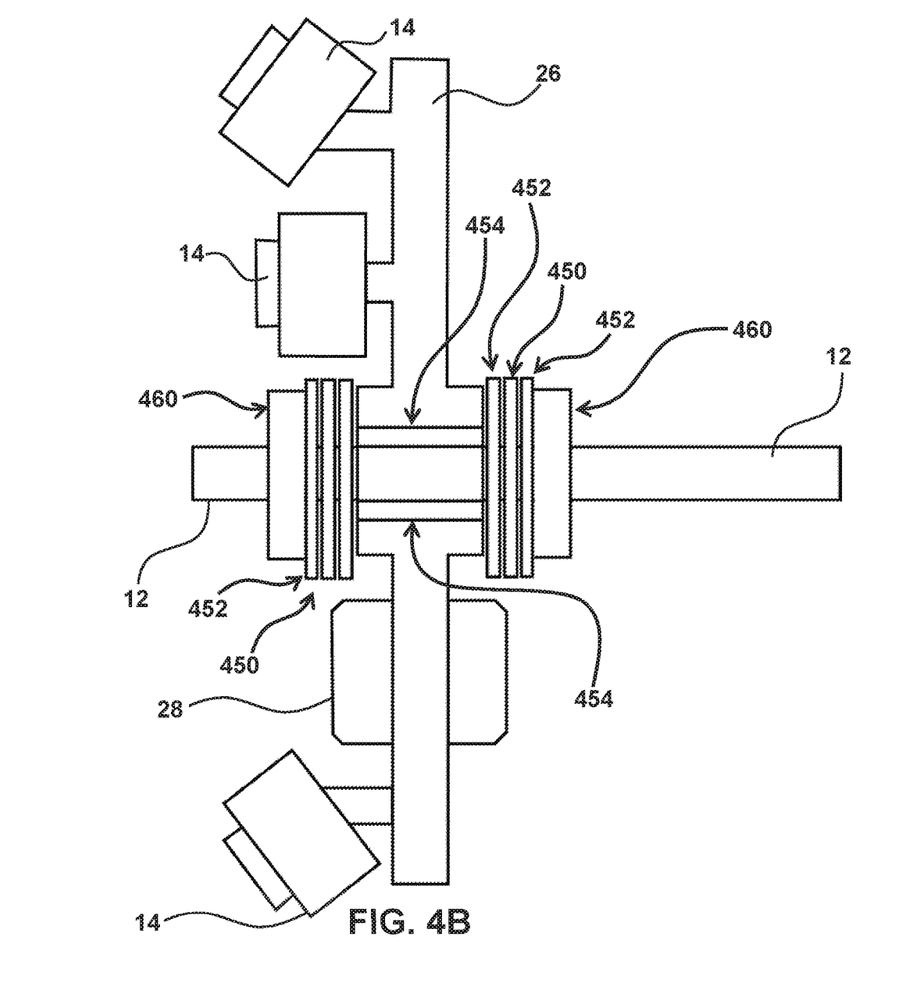
FIG. 4B illustrates the camera plate coupled to a body of the system, in accordance with one or more embodiments.

FIGS. 2-4 illustrate additional views of cameras 14, camera plate 26, and/or other components. For example, FIG. 2 illustrates a view of camera plate 26 with seven individual cameras 14 coupled to camera plate 26. As shown in FIG. 2, camera plate 26 may be coupled to body 12 (e.g., at or near leading end 22) and configured to support cameras 14. In this example, camera plate 26 has a circular cross section. In this example, cameras 14 comprise seven cameras 14 (one of these cameras 14 is not visible in FIG. 2). Cameras 14 may be coupled to camera plate 26 at radial positions 200, 202, 204, 206, 208, and 210, equidistant from each other at or near a circumference 212 of camera plate 26. One camera 14 may be coupled to camera plate 26 such that the camera occupies a position at or near a center 214 of camera plate 26. In some embodiments, the cameras 14 coupled to camera plate 26 along circumference 212 may be oriented to face the interior wall and/or other areas of a pipe that is holding system 10. In some embodiments, the camera 14 at or near the center of camera plate 26 may be oriented to point down the pipe along the axis of the pipe.

In some embodiments, a camera 14 oriented to point down the pipe may be coupled to camera plate 26 via an extension member 220. Extension member 220 extends from camera plate 26 away from body 12 along axis 20. In some embodiments, extension member 220 has dimensions and/or a shape configured to position a camera 14 with a field of view that does not include other cameras 14 and/or other portions of system 10. In some embodiments, extension member 220 may comprise extension brackets and/or other components. Extension member 220 may be formed from any material that allows system 10 to function as described herein. In some embodiments, one or more cameras 14 oriented to point down the pipe may be mounted directly to camera plate 26.

FIG. 3 illustrates a view of cameras 14 from first (e.g., leading) end 22 (shown in FIG. 1 and not labeled in FIG. 3). As described above, in some embodiments, camera plate 26 may be configured to rotate relative to body 12. For example, camera plate 26 and body 12 may be rotatably coupled via a rotating ball bearing based coupling, needle-roller bearings, sleeve bearings, thrust bearings, slip washers, and/or other couplings. In some embodiments, camera plate 26 may be configured to rotate around longitudinal axis 20 of system 10 (not labeled in FIG. 3, but would be popping out of the page directly toward the reader). Weight 28 may be configured to cause camera plate 26 to rotate relative to body 12 and around longitudinal axis 20 of system 10 to maintain an orientation 300 of cameras 14 relative to a pipe when system 10 travels through the pipe. For example, even if body 12 and support members 16 rotate 302 when system 10 travels through a pipe, weight 28 is configured to maintain cameras 14 in orientation 300. With camera plate 26 able to freely rotate relative to body 12, weight 28 may be influenced by gravity to remain as close as possible to a bottom or lowest surface of a pipe (thus keeping cameras 14 in or near orientation 300). In some embodiments, weight 28 weighs about 0.5 pounds to about 2 pounds (this example range is not intended to be limiting). In some embodiments, weight 28 may be coupled to camera plate 26 via a strap 310, nuts, screws, bolts, clamps, adhesive, clips, and/or other coupling components. In some embodiments, weight 28 may be coupled directly to camera plate 26 via nuts, screws, bolts, clamps, adhesive, clips, and/or other coupling components. The depiction of weight 28 in FIG. 3 as a hexagonal nut is not intended to be limiting. Weight 28 may have any shape or size that allows system 10 to function as described herein.

As shown in FIG. 3, cameras 14 may be coupled to body 12 (e.g., via camera plate 26) in different orientations such that cameras 14 are configured to obtain different but overlapping image information for different portions of the interior surface of a pipe. For example, FIG. 3 illustrates cameras 14 all pointing in different directions 304-316 outwardly from body 12 and/or camera plate 26. The different angles of orientation 304-316 may cause individual cameras 14 to obtain image information for different portions of the interior surface of a pipe. The image information from individual cameras 14 may be electronically stitched such that the image information comprises a view of the entirety (or near entirety) of the interior surface of the pipe over the distance that system 10 travels through the pipe.

FIG. 4A illustrates six cameras 14 coupled to camera plate 26 in different orientations. Cameras 14 are coupled to camera plate 26 at or near circumference 212. Cameras 14 may be coupled to camera plate 26 via coupling components 400 associated with individual cameras 14 and/or other components. Coupling components 400 may be coupled to camera plate 26 via holes in camera plate 26 (not visible in FIG. 4) and corresponding nuts, bolts, screws, clips, clamps, adhesive, and/or other components configured to engage the holes and/or each other to couple components 400 (and cameras 14) to camera plate 26. For example, as show in FIG. 4A, coupling components 400 may include tabs 402 configured to be positioned at or near the holes such that nuts, bolts, and/or screws 404 can be used in conjunction with the holes to couple cameras 14 to camera plate 26. In some embodiments, coupling components 400 may be configured to facilitate adjustment of an angle of an individual camera relative to other cameras 14, camera plate 26, body 12, and/or other components of system 10. The adjustable angle may allow the different orientations of cameras 14 described above (e.g., such that cameras 14 are configured to obtain different but overlapping image information for different portions of the interior surface of a pipe).

In some embodiments, camera plate 26 may form an orifice 410. Orifice 410 may be configured to receive and/or engage a portion of body 12 (FIG. 1), extension member 220 (FIG. 2), and/or other components of system 10. In some embodiments, camera plate 26 may include a groove 412 that surrounds orifice 410. Groove 412 may facilitate receipt of and/or engagement with body 12 and/or extension member 220, facilitate rotation of camera plate 26 relative to body 12, and/or provide other functionality. For example, groove 412 may receive ball bearings configured to facilitate the rotation of camera plate 26 around body 12. In some embodiments, body 12 is configured to slide through orifice 410. As shown in FIG. 4B, camera plate 26 may be sandwiched between two thrust bearings 450 (with washers 452) that are themselves sandwiched between two clamps 460 that directly clamp by friction to body 12. Free-rotation of camera plate 26 may be enhanced by the use of roller bearings 454, for example.

Returning to FIG. 1, one or more support members 16 may be coupled to body 12. Support members 16 may extend away from body 12 in radial direction(s) 30 and/or other directions. Support members 16 may be configured to contact the interior surface of a pipe and support body 12 in the pipe when system 10 is inserted in the pipe. In some embodiments, support members 16 may have a cylindrical, tubular, square, and/or rectangular cross sectional shape, and/or have other cross sectional shapes. In some embodiments, support members 16 may be formed from metal, polymers, and/or other materials. For example, in some embodiments, support members 16 may be formed from steel, stainless steel, plastic, reinforced composites such as fiber glass or carbon fiber, and/or other materials.

An individual support member 16 may have a first end 32 coupled to body 12, and a second end 34 configured to contact the interior surface of the pipe. In some embodiments, support members 16 may comprise at least three support members. In some embodiments, support members 16 may comprise six support members. In some embodiments, system 10 may comprise a first set 38 of support members 16 and a second set 40 of support members 16. First set 38 of support members 16 may be coupled to first (e.g., leading) end 22 of body 12 and second set 40 of support members 16 may be coupled to second, opposite (e.g., trailing) end 24 of body 12 such that body 12 extends between first set 38 and second set 40 along longitudinal axis 20 of system 10. In some embodiments, as shown in FIG. 1, first set 38 and second set 40 of support members 16 may individually comprise six support members 16.

In some embodiments, system 10 may comprise one or more wheels 42 coupled to support members 16 at or near second ends 34. Wheels 42 may be configured to contact the interior surface of a pipe and facilitate movement of system 10 through the pipe. Wheels 42 may be formed from rubber and/or other materials. As an example, wheels 42 may be similar to and/or the same as neoprene rollers such as those available through McMaster-Carr, part number 22875T7. Wheels 42 may be coupled to ends 34 via screws, nuts, bolts, fasteners, adhesive, clamps, clips, and/or other coupling devices. For example, wheels 42 may be coupled to ends 34 via tabs that couple to ends 34 of support members 16. The tabs may include a male thread portion that is configured to engage a female thread portion in a support member 16 (e.g., or vice versa). Individual wheels may be bolted through a tab using a bolt and a corresponding nut, for example. Wheels 42 may be attached to support members 16 by the use of threaded rod end bolts that are screwed into the ends of members 16 via threaded tube ends or other bracketry that enables free rotation of the wheels 42 beyond the outer end of members 16. Wheels 42 may be coupled to support members 16 in an orientation such that the wheels are normal to an interior surface of a pipe (e.g., at an individual radial location) and facilitate movement of system 10 through a pipe.

One or more light sources 18 may be configured to light the interior surface of the pipe and/or other areas. Light sources 18 may be coupled to support members 16 at or near their second ends 34 such that light sources 18 may be located in one or more radial positions near the interior surface of the pipe, separated from cameras 14 and body 12 by support members 16. For example, as shown in FIG. 1, light sources 18 may be located closer to wheels 42 than cameras 14. A portion of a support member 16 may run between a given light source 18 and cameras 14. As an example, light sources 18 may be similar to and/or the same as any light source that provides a flood beam effect. For underwater use, light sources 18 may comprise dive lamps. An example is the Hydra 2500 diving video light by Kraken Sports. Light sources 18 may be coupled to support members 16 via screws, nuts, bolts, fasteners, adhesive, clamps, clips, and/or other coupling devices. For example, light sources 18 may be coupled to support members 16 via adjustable spring biased clamps that allow the individual positions of the light sources 18 to be adjusted (e.g., unclamped, moved, and re-clamped) to any location along a given support member 16. In some embodiments, light sources 18 may be coupled to system 10 by a tab welded to the legs. Light sources 18 may be screwed onto the tabs with a bolt and a nut, for example.

Figure 5:
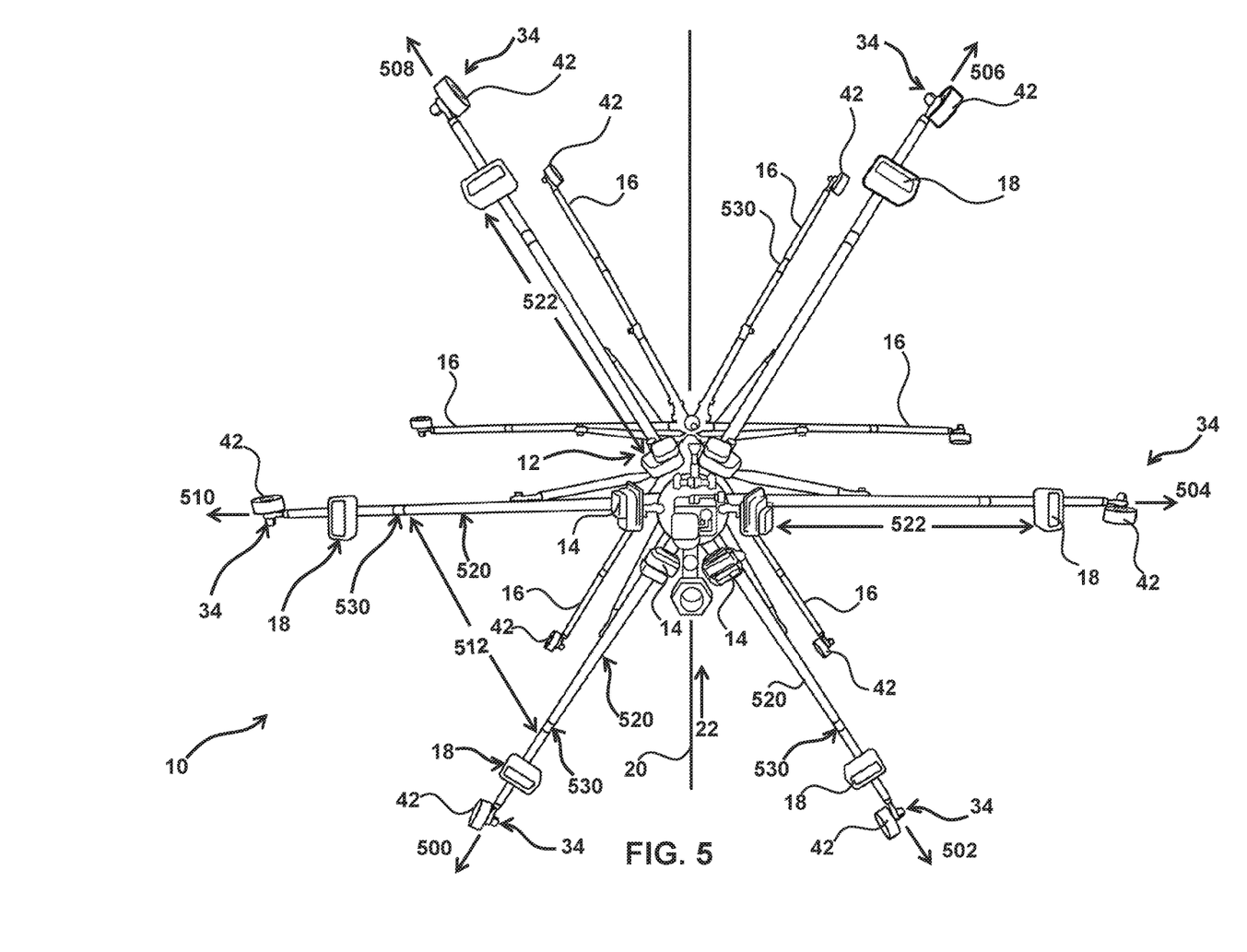
FIG. 5 illustrates a view of the first end of the system, in accordance with one or more embodiments.

FIGS. 5-9 provide additional views of body 12, support members 16, light sources 18, and/or other components of system 10. For example, FIG. 5 illustrates an end view of system 10. The view is toward first (or leading) end 22 of system 10. As shown in FIG. 5, six support members 16 may extend from body 12 at or near first (or leading) end 22 at different radial positions 500-510. Six additional support members 16 may extend from body 12 at radial positions 500-510 at or near second (or trailing) end 24. Radial positions 500-510 may be substantially equidistant from each other, separated by an angle 512. In some embodiments, angle 512 may be approximately 60 degrees.

In some embodiments, support members 16 may have a length of about 9 inches to about 72 inches (this example range is not intended to be limiting. In some embodiments, the length of a support member 16 may be adjustable. For example, a given support member may include one or more sections and/or joints 530 configured to telescopically extend relative to another section of the support member. The length of the support member 16 may be set by fixing a telescoping section at a particular position. As another example, the sections of a given support member 16 may be configured to be threaded and/or otherwise coupled together (e.g., at joints 530) such that threaded sections of different lengths may be used to set the length of the given support member 16. Other examples are contemplated.

In some embodiments, support members 16 may be configured such that not all of the support members 16 need contact the interior surface of the pipe when system 10 is in a pipe. For example, one or more support members 16 may be configured with a length that is shorter than other support members 16. In some embodiments, a diameter of a pipe that holds system 10 may be large enough that not all support members engage an interior surface of the pipe. For example, only two support members 16 on each end of system 10 may contact the interior surface of the pipe and support system 10 in the pipe.

Light sources 18 are also illustrated in FIG. 5. Light sources 18 may be located on the individual support members 16 that extend from body 12 at or near first end 22. Light sources 18 may be coupled to support members 16 at or near their second ends 34 such that light sources 18 are located in one or more radial positions 500-510 near the interior surface of a pipe, separated from cameras 14 and body 12 by support members 16. For example, as shown in FIG. 5, light sources 18 may be located closer to wheels 42 than cameras 14. A portion 520 of a support member 16 runs between a given light source 18 and cameras 14. In some embodiments, a distance 522 between a given light source 18 and cameras 14 may be about 6 inches to about 69 inches (this example is not intended to be limiting). In some embodiments, distance 522 may be adjustable. For example, light sources 18 may be moved via the telescoping action of support members 16 described above, light sources 18 may be moved by decoupling a light source 18 from a support member 16 and then recoupling the light source 18 at a different position, and/or by other methods.

In some embodiments, individual light sources 18 may be the same or different. In some embodiments, individual light sources 18 may provide light of different wavelength and/or varying intensity. In FIG. 5, one light source 18 is shown located on each one of these support members. However, light sources 18 may have other arrangements. For example, more than one light source may be coupled to an individual support member 16. Light sources 18 may be coupled to less than each one of the support members 16 (e.g., light sources 18 may be coupled to every other support member 16, and/or have other arrangements). Light sources 18 may be oriented at different angles relative to support member 16 and/or each other, and/or have other differences. In some embodiments, light sources 18 may be coupled to one or more support members 16 extending from body 12 at or near second end 24. In some embodiments, system 10 may not have any light sources 18, for example. It should be noted that the number and positions of support members 16 and/or light sources 18 shown in FIG. 5 is not intended to be limiting. Support members 16 and/or light sources 18 may have any orientation that allows system 10 to function as described herein.

Figure 6:
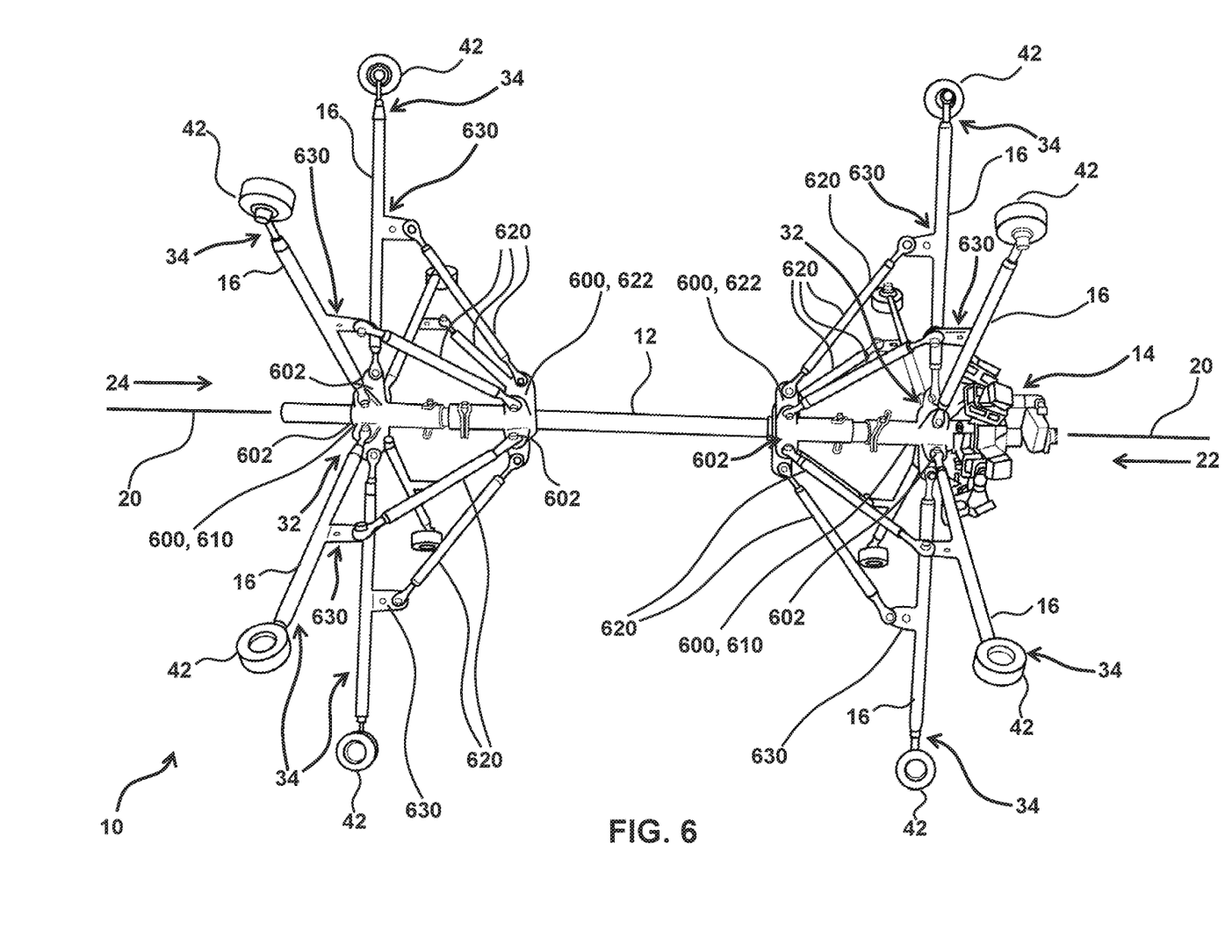
FIG. 6 illustrates a side view of the system, in accordance with one or more embodiments.

FIG. 6 illustrates a side view of system 10. FIG. 6 illustrates body 12, cameras 14, support members 16, wheels 42, and/or other components of system 10. In some embodiments, as shown in FIG. 6, body 12 may be formed by a metal cylinder or tube. Support members 16 may be coupled to body 12 by one or more joints 600. In some embodiments, joints 600 may be configured to couple with body 12 by passing a central tubular portion of a joint 600 over body 12 and then securing the joint 600 to body 12 at a desired position via a pin, a set screw, nuts, bolts, other screws, claims, clips, adhesive, and/or other coupling mechanisms. In the example shown in FIG. 6, joints 600 are pinned in place on body 12 via pins and corresponding orifices in body 12 (not visible in FIG. 6). In some embodiments, joints 600 may be similar to and/or the same as clevis rod ends provided by McMaster-Carr, part number 4749T15. In some embodiments, joints 600 may include tabs 602 configured to couple with first ends 32 of individual support members 16. Tabs 602 may be coupled with first ends via nuts, bolts, screws, claims, clips, pins, adhesive, and/or other coupling mechanisms.

In some embodiments, support members 16 may be coupled to body 12 via first joints 610 and/or other components. System 10 may also include secondary support members 620. Secondary support members 620 may be coupled to body 12 via second joints 622 and/or other components. Secondary support members 620 may be coupled to support members 16 along support members 16 between first ends 32 and second ends 34. For example, as shown in FIG. 6, secondary support members 620 may be coupled to support members 16 at a tab 630 of a given support member 16 that is located between first end 32 and second end 34. Secondary support members 620 may be coupled to tabs 630 via nuts, bolts, screws, claims, clips, pins, adhesive, and/or other coupling mechanisms.

In some embodiments, support members 16 are coupled to body 12 by joints 610 and 622 configured to facilitate movement of support members 16 from a radially extended position to a collapsed position proximate to body 12, and vice versa. In some embodiments, body 12, support members 16, secondary support members 620, joints 610 and 622, tabs 602 and 630, and/or other components of system 10 are configured for this purpose and/or other purposes. For example, joints 622 may be decoupled from a fixed position on body 12 and moved toward each other. This movement may cause rotation of secondary support members 620 relative to tabs 602 in joints 622, and then pulling on tabs 630 and support members 16 by secondary support members 620. Support members 16 may rotate in tabs 602 of joints 610 in response to the pulling, causing support members 16 at either end of system 10 to collapse toward each other and/or body 12. In some embodiments, either or both of joints 610 and 622 may be decoupled from fixed positions on body 12 and moved in opposite directions (e.g., toward the ends of body 12) to facilitate the same or similar collapse of support members 16 (but in the opposite direction).

Figure 7:
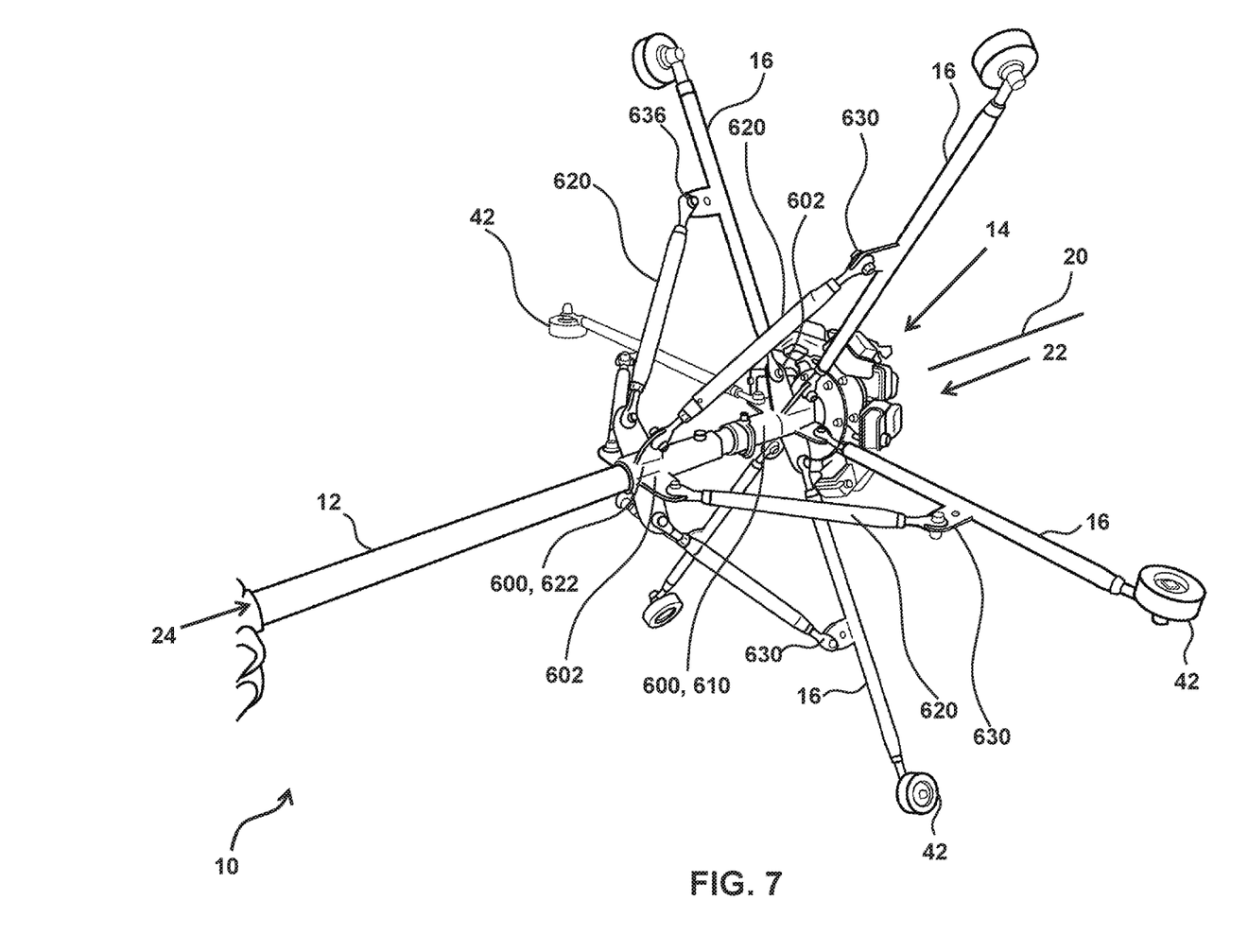
FIG. 7 illustrates another view of the first end of the system from a position at or near a second (opposite) end of the system, in accordance with one or more embodiments.

FIG. 7 illustrates a view of first end 22 of system 10 from a position at or near second end 24. FIG. 7 illustrates body 12, cameras 14, support members 16, secondary support members 620, joints 610 and 622, wheels 42, tabs 602, tabs 630, and/or other components of system 10. As shown in FIG. 7, system 10 may be supported by two support members 16 (e.g., at each end) of system 10. FIG. 7 also provides another view of how joint 622 may be decoupled from a fixed position on body 12 and moved toward second end 24. This movement may cause rotation of secondary support members 620 relative to tabs 602 in joints 622, and then pulling on tabs 630 and support members 16 by secondary support members 620. Support members 16 may rotate in tabs 602 of joints 610 in response to the pulling, causing support members 16 at end 22 of system 10 to collapse toward body 12.

Figure 8:
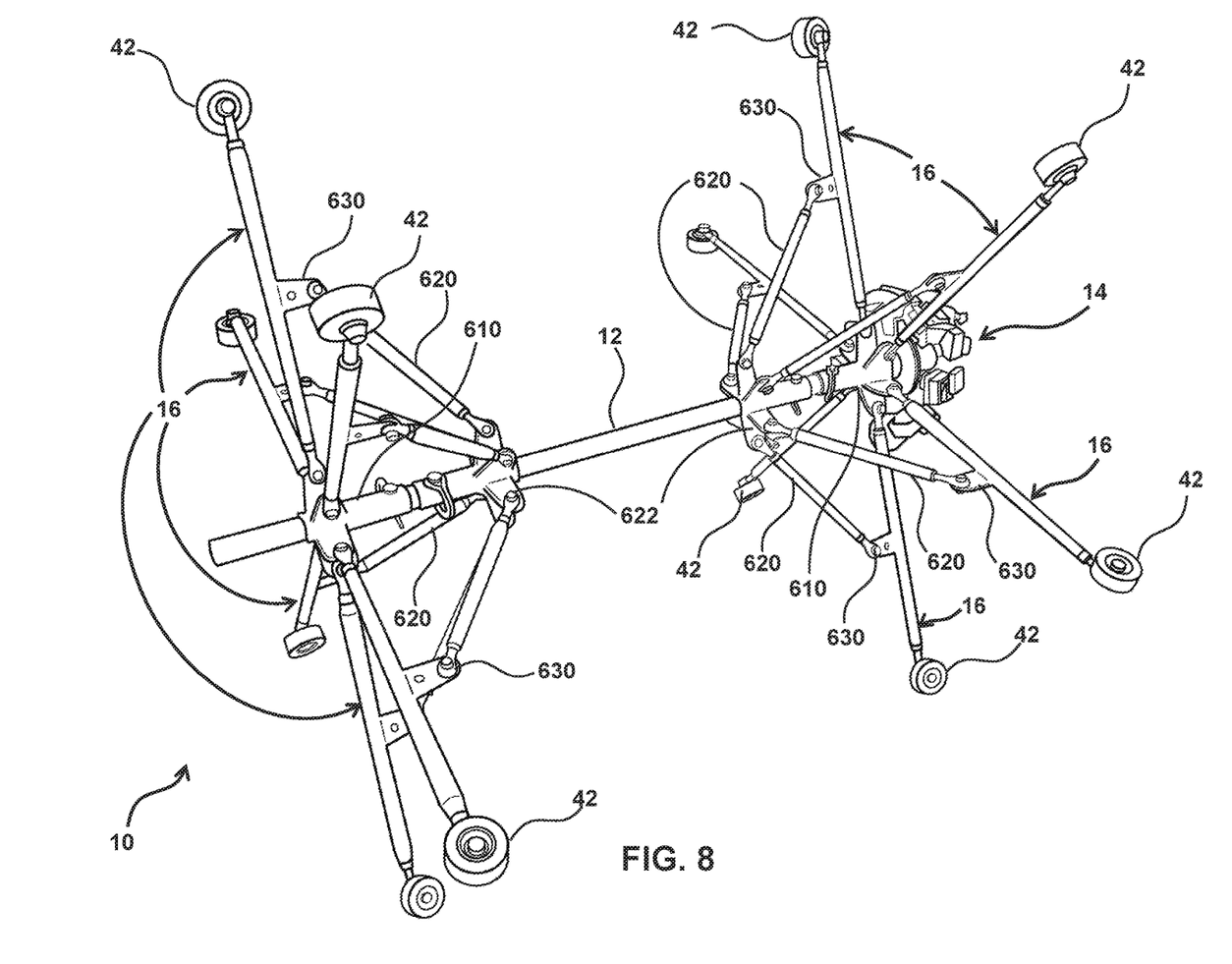
FIG. 8 provides a perspective view of the system, in accordance with one or more embodiments.

FIG. 8 provides a perspective view of system 10. FIG. 8 illustrates body 12, cameras 14, support members 16, secondary support members 620, joints 610 and 622, wheels 42, tabs 630, and/or other components of system 10. As shown in FIG. 8, support members 16 have been shortened (as described above) relative to support members 16 shown in other figures (e.g., FIG. 1, FIG. 5).

Figure 9:
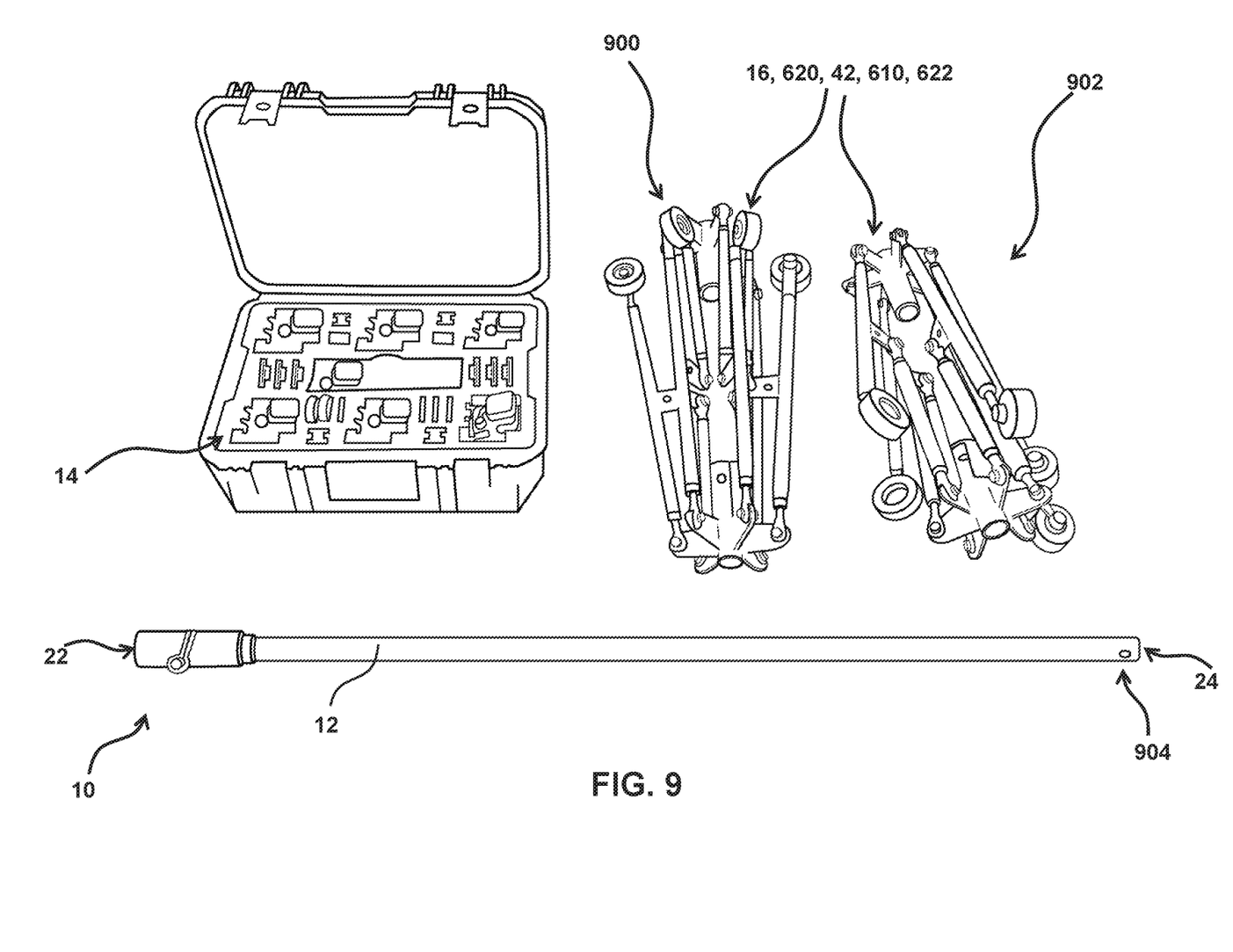
FIG. 9 illustrates the system disassembled into multiple pieces, in accordance with one or more embodiments.

FIG. 9 illustrates system 10 disassembled and/or otherwise separated into multiple pieces. As shown in FIG. 9, individual cameras 14 may be removed from camera plate 26 (not shown in FIG. 9) and/or body 12. Individual cameras 14 are shown inserted into a protective carrying case in FIG. 9. Support members 16 and secondary support members 620 may be moved to a collapsed position as described above, and then removed from body 12. As shown in FIG. 9, support members 16 and secondary support members 620 from first end 22 may form a first set 900, and support members 16 and secondary support members 620 from second end 24 may form a second set 902. Removal from body 12 may be accomplished by decoupling (e.g., unpinning) joints 610 and 622 from body 12 and sliding joints 610 and 622 off of body 12. An orifice 904 configured to receive a pin associated with one of the joints is illustrated in FIG. 9, for example. Joints 610 and 622, support members 16, and secondary support members 620 may remain coupled together when removed from body 12. This may facilitate easy re-assembly (e.g., inside a utility pipe).

In some embodiments, system 10 may comprise a transmitter and/or other components operatively coupled to and/or included in cameras 14 configured to transmit the image information to an external computing system. In some embodiments, system 10 may include electronic storage comprising electronic storage media that electronically stores information. The electronic storage media may comprise one or both of system storage that is provided integrally (i.e., substantially non-removable) with (e.g., the cameras of) system 10 and/or removable storage that is removably connectable to system 10 via, for example, a port (e.g., a USB port, a firewire port, etc.) or a drive (e.g., a disk drive, etc.). The electronic storage may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), cloud storage, and/or other electronically readable storage media. The electronic storage may store software algorithms, information obtained by cameras 14, information received from external computing systems, and/or other information that enables system 10 to function as described herein. The electronic storage may be (in whole or in part) a separate component within system 10, or the electronic storage may be provided (in whole or in part) integrally with one or more other components of system 10 (e.g., cameras 14).

Figure 10:
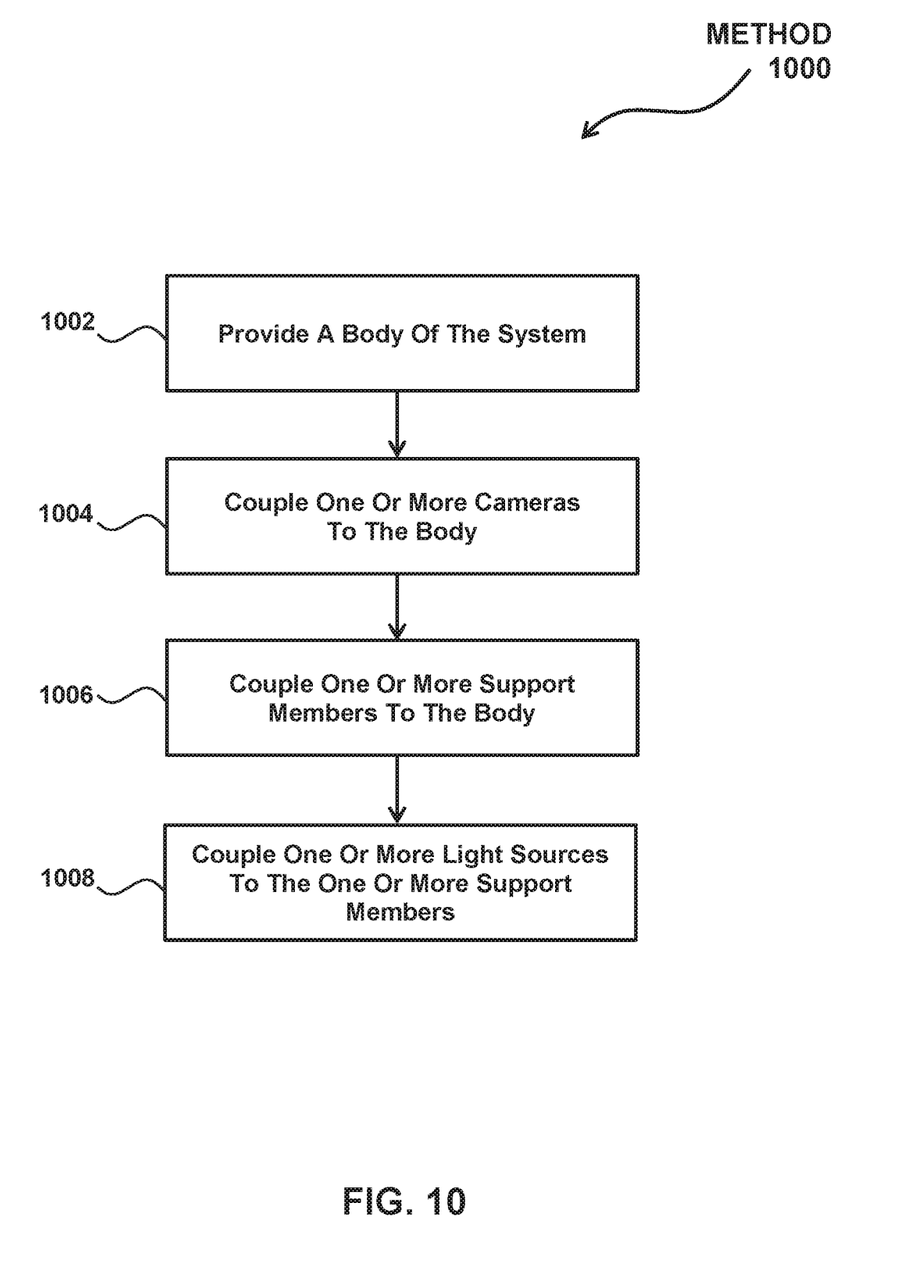
FIG. 10 illustrates a method of assembling a pipeline inspection system, in accordance with one or more embodiments.

FIG. 10 illustrates a method 1000 of assembling a pipeline inspection system. The operations of method 1000 presented below are intended to be illustrative. In some embodiments, method 1000 may be accomplished with one or more additional operations not described, and/or without one or more of the operations discussed. Additionally, the order in which the operations of method 1000 are illustrated in FIG. 10 and described below is not intended to be limiting.

At an operation 1002, a body of the system is provided. The body extends along a longitudinal axis of the system. The longitudinal axis of the system corresponds to a longitudinal axis of a pipe when the system is inserted in the pipe. In some embodiments, operation 1002 may be performed by a body that is the same as or similar to body 12 (shown in FIG. 1 and described herein).

At an operation 1004, one or more cameras are coupled to the body. The one or more cameras are configured to obtain image information related to an interior surface of the pipe. In some embodiments, the one or more cameras comprise at least two cameras, and operation 1004 comprises coupling the at least two cameras to a camera plate at radial positions equidistant from each other at or near a circumference of the camera plate. In some embodiments, the camera plate comprises a weight. In some embodiments, operation 1004 comprises causing, with the weight, the camera plate to rotate relative to the body and around the longitudinal axis of the system to maintain an orientation of the at least two cameras relative to the pipe when the system travels through the pipe. In some embodiments, operation 1004 may be performed by cameras that are the same as or similar to cameras 14 (shown in FIG. 1 and described herein).

At an operation 1006, one or more support members are coupled to the body. The one or more support members extend away from the body in a radial direction. The one or more support members are configured to contact the interior surface of the pipe and support the body in the pipe when the system is inserted in the pipe. An individual support member has a first end coupled to the body, and a second end configured to contact the interior surface of the pipe. In some embodiments, one or more wheels are coupled to the second end of the one or more support members (e.g., such that a given support member includes one or more wheels). The one or more wheels are configured to contact the interior surface of the pipe and facilitate movement of the system through the pipe. In some embodiments, the one or more support members are coupled to the body by one or more joints configured to facilitate movement of the one or more support members from a radially extended position to a collapsed position proximate to the body and vice versa. In some embodiments, operation 1006 may be performed by support members that are the same as or similar to support members 16 (shown in FIG. 1 and described herein).

At an operation 1008, one or more light sources are coupled to the one or more support members. The one or more support members extend away from the body in a radial direction. The one or more support members are configured to contact the interior surface of the pipe and support the body in the pipe when the system is inserted in the pipe. An individual support member has a first end coupled to the body, and a second end configured to contact the interior surface of the pipe. The one or more light sources are coupled to the one or more support members at or near the second end such that the one or more light sources are located in one or more radial positions near the interior surface of the pipe, separated from the one or more cameras and the body by the one or more support members. The one or more light sources are configured to light the interior surface of the pipe. In some embodiments, operation 1008 may be performed by light sources that are the same as or similar to light sources 18 (shown in FIG. 1 and described herein).

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A pipeline inspection system comprising:
    a body, the body extending along a longitudinal axis, the longitudinal axis corresponding to a longitudinal axis of a pipe when the body is inserted in the pipe;
    one or more cameras coupled to the body, the one or more cameras configured to obtain image information related to an interior surface of the pipe;
    a camera plate coupled to the body and configured to support the one or more cameras, the camera plate comprising a weight configured to cause the camera plate to rotate relative to the body and around the longitudinal axis of the body to maintain an orientation of the one or more cameras relative to the pipe when the body travels through the pipe;
    one or more support members coupled to the body, the one or more support members extending away from the body in a radial direction, the one or more support members configured to contact the interior surface of the pipe and support the body in the pipe when the body is inserted in the pipe, wherein an individual support member has a first end coupled to the body, and a second end configured to contact the interior surface of the pipe; and
    one or more light sources configured to light the interior surface of the pipe, the one or more light sources coupled to the one or more support members at or adjacent the second end such that the one or more light sources are located in one or more radial positions adjacent the interior surface of the pipe, separated from the one or more cameras and the body by the one or more support members.

2. The system of claim 1, wherein the body comprises a leading end and a trailing end, and wherein the one or more cameras are coupled to the body at or adjacent the leading end.

3. The system of claim 1, wherein the camera plate has a circular cross section.

4. The system of claim 1, further comprising one or more wheels coupled to the second end of the one or more support members, the one or more wheels configured to contact the interior surface of the pipe and facilitate movement of the body through the pipe.

5. The system of claim 1, wherein the one or more support members comprise at least three support members.

6. The system of claim 1, further comprising a plurality of additional support members coupled to the body, and where the plurality of additional support members are configured such that not all support members in the plurality of additional support members need contact the interior surface of the pipe when the body is in the pipe.

7. The system of claim 1, wherein the one or more support members are coupled to the body by one or more joints configured to facilitate movement of the one or more support members from a radially extended position to a collapsed position proximate to the body and vice versa.

8. The system of claim 1, further comprising a first set of the one or more support members and a second set of the one or more support members, the first set of the one or more support members coupled to a first end of the body and the second set of the one or more support members coupled to a second, opposite end of the body such that the body extends between the first set and the second set along the longitudinal axis of the body.

9. A pipeline inspection system comprising:
    a body, the body extending along a longitudinal axis, the longitudinal axis corresponding to a longitudinal axis of a pipe when the body is inserted in the pipe;
    at least two cameras coupled to the body, the at least two cameras configured to obtain image information related to an interior surface of the pipe, wherein the at least two cameras are coupled to the body via a camera plate at radial positions equidistant from each other at or adjacent a circumference of the camera plate;

one or more support members coupled to the body, the one or more support members extending away from the body in a radial direction, the one or more support members configured to contact the interior surface of the pipe and support the body in the pipe when the body is inserted in the pipe, wherein an individual support member has a first end coupled to the body, and a second end configured to contact the interior surface of the pipe; and one or more light sources configured to light the interior surface of the pipe, the one or more light sources coupled to the one or more support members at or adjacent the second end such that the one or more light sources are located in one or more radial positions adjacent the interior surface of the pipe, separated from the one or more cameras and the body by the one or more support members.

10. A pipeline inspection system comprising:

a body, the body extending along a longitudinal axis, the longitudinal axis corresponding to a longitudinal axis of a pipe when the body is inserted in the pipe;

at least two cameras coupled to the body, the at least two cameras configured to obtain image information related to an interior surface of the pipe, wherein the at least two cameras are coupled to the body in different orientations such that the at least two cameras are configured to obtain different but overlapping image information for different portions of the interior surface of the pipe;

one or more support members coupled to the body, the one or more support members extending away from the body in a radial direction, the one or more support members configured to contact the interior surface of the pipe and support the body in the pipe when the body is inserted in the pipe, wherein an individual support member has a first end coupled to the body, and a second end configured to contact the interior surface of the pipe; and one or more light sources configured to light the interior surface of the pipe, the one or more light sources coupled to the one or more support members at or adjacent the second end such that the one or more light sources are located in one or more radial positions adjacent the interior surface of the pipe, separated from the one or more cameras and the body by the one or more support members.

11. A method of assembling a pipeline inspection system, the method comprising:

providing a body, the body extending along a longitudinal axis, the longitudinal axis corresponding to a longitudinal axis of a pipe when the body is inserted in the pipe;

coupling one or more cameras to the body using a camera plate, the one or more cameras configured to obtain image information related to an interior surface of the pipe, wherein the camera plate comprises a weight;

causing, with the weight, the camera plate to rotate relative to the body and around the longitudinal axis of the body to maintain an orientation of the one or more cameras relative to the pipe when the body travels through the pipe;

coupling one or more support members to the body, the one or more support members extending away from the body in a radial direction, the one or more support members configured to contact the interior surface of the pipe and support the body in the pipe when the body is inserted in the pipe, wherein an individual support member has a first end coupled to the body, and a second end configured to contact the interior surface of the pipe; and coupling one or more light sources to the one or more support members at or adjacent the second end such that the one or more light sources are located in one or more radial positions adjacent the interior surface of the pipe, separated from the one or more cameras and the body by the one or more support members, the one or more light sources configured to light the interior surface of the pipe.

12. The method of claim 11, further comprising coupling one or more wheels to the second end of the one or more support members, the one or more wheels configured to contact the interior surface of the pipe and facilitate movement of the body through the pipe.

13. The method of claim 11, further comprising coupling the one or more support members to the body by one or more joints configured to facilitate movement of the one or more support members from a radially extended position to a collapsed position proximate to the body and vice versa.

14. A method of assembling a pipeline inspection system, the method comprising:

providing a body, the body extending along a longitudinal axis, the longitudinal axis corresponding to a longitudinal axis of a pipe when the body is inserted in the pipe;

coupling at least two cameras to the body, the at least two cameras configured to obtain image information related to an interior surface of the pipe coupling the at least two cameras to a camera plate at radial positions equidistant from each other at or adjacent a circumference of the camera plate;

coupling one or more support members to the body, the one or more support members extending away from the body in a radial direction, the one or more support members configured to contact the interior surface of the pipe and support the body in the pipe when the body is inserted in the pipe, wherein an individual support member has a first end coupled to the body, and a second end configured to contact the interior surface of the pipe; and coupling one or more light sources to the one or more support members at or adjacent the second end such that the one or more light sources are located in one or more radial positions adjacent the interior surface of the pipe, separated from the one or more cameras and the body by the one or more support members, the one or more light sources configured to light the interior surface of the pipe.

* * * * *